United States Patent
Wong

(10) Patent No.: US 7,937,375 B2
(45) Date of Patent: May 3, 2011

(54) METHOD AND APPARATUS FOR MASKING INDEX VALUES IN A DATABASE

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 304 days.

(21) Appl. No.: 11/780,340

(22) Filed: Jul. 19, 2007

(65) Prior Publication Data

US 2009/0024565 A1    Jan. 22, 2009

(51) Int. Cl.
G06F 7/00   (2006.01)
G06Q 40/00  (2006.01)

(52) U.S. Cl. .......................................... 707/696; 705/35
(58) Field of Classification Search .................. None
See application file for complete search history.

(56) References Cited

U.S. PATENT DOCUMENTS

| | | | |
|---|---|---|---|
| 5,787,274 A * | 7/1998 | Agrawal et al. ................... 1/1 |
| 6,012,064 A * | 1/2000 | Gibbons et al. ............ 707/103 R |
| 6,587,466 B1 * | 7/2003 | Bhattacharya et al. .. 370/395.21 |
| 2005/0144176 A1 * | 6/2005 | Lei et al. ......................... 707/100 |
| 2008/0104102 A1 * | 5/2008 | Zhang ............................. 707/102 |
| 2009/0006314 A1 * | 1/2009 | Balmin et al. ..................... 707/2 |

* cited by examiner

*Primary Examiner* — Neveen Abel Jalil
*Assistant Examiner* — Tarek Chbouki
(74) *Attorney, Agent, or Firm* — Park, Vaughan, Fleming & Dowler LLP; Shun Yao

(57) ABSTRACT

One embodiment of the present invention provides a system for masking index values in a database. During operation, the system receives a request to mask a column in a database, wherein the column is an index-column. Next, the system retrieves a tree which is used to index the column, wherein the tree provides a sorted representation of values in the column. The system then locates the root-node of the tree. Then, for each child-node in the tree, the system determines if the child-node is a leaf-node. If so, the system masks a node-value for the leaf-node without resorting the tree. If not, the system leaves the node-value unmasked.

21 Claims, 7 Drawing Sheets

METHOD AND APPARATUS FOR MASKING INDEX VALUES IN A DATABASE

BACKGROUND

1. Field of the Invention

The present invention relates to techniques for protecting data in databases. More specifically, the present invention relates to a method and apparatus for masking an index value in a database.

2. Related Art

Before an organization releases a new data-processing application, the organization typically tests the functionality of the application to ensure that the application is functioning in accordance with a specification. Testing the application often requires access to a large amount of sample data. In many cases, generating this large amount of sample data can be time-consuming and inconvenient.

One solution to this problem is to use existing real data. Many organizations use existing data from other data-processing applications, or they purchase existing data from other organizations. However, this existing data often includes sensitive information, such as social security numbers. To protect this sensitive data from unauthorized access, an organization typically masks the sensitive data. Applications often store their data in databases, which use B-trees to index the data. However, masking the data stored in nodes in these B-trees can be a time-consuming task. In the worst case, masking the data in a B-tree node requires $O(n \log(n))$ operations.

Hence, what is needed is a method and apparatus for efficiently masking data in a database index.

SUMMARY

One embodiment of the present invention provides a system for masking index values in a database. During operation, the system receives a request to mask a column in a database, wherein the column is an index-column. Next, the system retrieves a tree which is used to index the column, wherein the tree provides a sorted representation of values in the column. The system then locates the root-node of the tree. Then, for each child-node in the tree, the system determines if the child-node is a leaf-node. If so, the system masks a node-value for the leaf-node without resorting the tree. If not, the system leaves the node-value unmasked.

In a variation on this embodiment, the system traverses the tree, starting from the root-node, until all leaf-nodes have been visited.

In a variation on this embodiment, the tree is a B-tree.

In a further variation, traversing the tree involves identifying node-values associated with the root-node and each visited child-node.

In a variation on this embodiment, masking the node-value involves identifying a lower-bound and an upper-bound for the leaf-node. The system then determines if the difference between the lower-bound and the upper-bound is larger than a threshold. If so, the system generates a random value which is between the lower-bound and the upper-bound. Next, the system replaces the node-value with the random value. Then, the system replaces a corresponding column-value with the random value. If the difference between the lower-bound and the upper-bound is not larger than the threshold, the system adjusts the lower-bound and the upper-bound so that the difference between the lower-bound and the upper-bound is larger than the threshold.

In a further variation, identifying the lower-bound for the leaf-node involves determining if an ancestor-node of the leaf-node has a value that is lower than the node-value. If so, the system assigns the lower-bound to have the value of the ancestor-node that is closest to the node-value, and that is lower than the node-value. If not, the system assigns the lower-bound to have a minimum-value, which is the lowest value that can be associated with a node in the tree.

In a further variation, identifying the upper-bound for the leaf-node involves determining if an ancestor-node of the leaf-node has a value that is greater than the node-value. If so, the system assigns the upper-bound to have the value of the ancestor-node that is closest to the node-value, and that is greater than the node-value. If not, the system assigns the upper-bound to have a maximum-value, which is the highest value that can be associated with a node in the tree.

In a further variation, adjusting the lower-bound and the upper-bound involves identifying an ancestor lower-bound and an ancestor upper-bound which are associated with an ancestor-node of the leaf-node. The system then determines if the difference between the ancestor lower-bound and the ancestor upper-bound is larger than an ancestor threshold. If so, the system generates an ancestor random value which is between the ancestor lower-bound and the ancestor upper-bound. The system then replaces a node-value associated with the ancestor-node with the ancestor random value. If the difference between the ancestor lower-bound and the ancestor upper-bound is not larger than an ancestor threshold, the system rejects the request to mask the column.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a system for masking a column in a database. This system masks the column using a heuristic that is on the order of O(n). In one embodiment of the present invention, this masking heuristic involves traversing a tree that is a sorted representation of the column. While traversing the tree, the system identifies node-values associated with each node in the tree. For each leaf-node, the masking system generates a random value that is between a lower-bound and an upper-bound, wherein the upper-bound and the lower-bound are associated with an ancestor-node of the leaf-node. Then, the masking system replaces the node-value of the leaf-node with the random value.

In one embodiment of the present invention, the tree can be a B-tree.

In one embodiment of the present invention, by selecting a random value that is between the lower-bound and the upper-bound of the ancestor-node, the masking system is able to mask the leaf-nodes without resorting and rebuilding the tree.

In one embodiment of the present invention, the masking system follows a pointer which is associated with the leaf-node to access a row in the table associated with the leaf-node. Then, the masking system replaces a column-value which is associated with the leaf-node and the row in the table with the random value.

In one embodiment of the present invention, the column is an index-column and the node-values that are associated with the leaf-nodes are index-values for a database.

In one embodiment of the present invention, the masking system only masks node-values associated with the leaf-nodes of the tree.

In one embodiment of the present invention, the masking system masks node-values associated with any node of the tree.

Computing Environment

Figure 1:
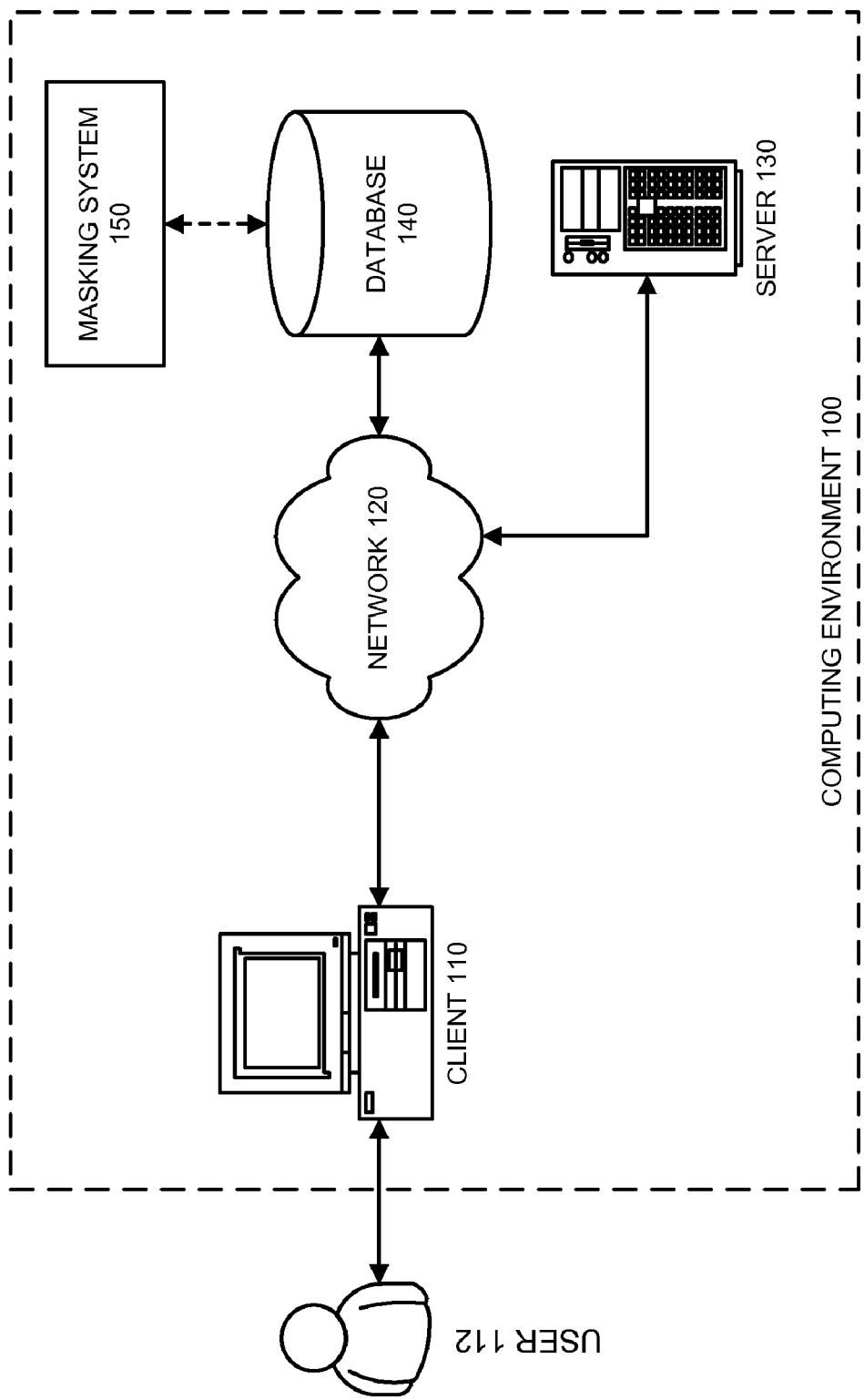
FIG. 1 illustrates a computing environment in accordance with an embodiment of the present invention.

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, computing environment 100 includes: client 110, network 120, server 130, database 140, and masking system 150.

Client 110 can generally include any node on a network including computational capability and including a mechanism for communicating across the network.

Network 120 can generally include any type of wired or wireless communication channel capable of coupling together computing nodes. This includes, but is not limited to, a local area network, a wide area network, or a combination of networks. In one embodiment of the present invention, network 120 comprises the Internet.

Server 130 can generally include any computational node including a mechanism for servicing requests from a client for computational and/or data storage resources. Furthermore, server 130 can generally include any system that can receive data from database 140.

In one embodiment of the present invention, server 130 can be a third-party system.

Database 140 can generally include any type of system for storing data in non-volatile storage. This includes, but is not limited to, systems based upon magnetic, optical, and magneto-optical storage devices, as well as storage devices based on flash memory and/or battery-backed up memory.

Masking system 150 can generally include any system capable of masking data.

In one embodiment of the present invention, database 140 contains masking system 150.

In one embodiment of the present invention, masking system 150 is a stand-alone system.

User 112 can generally include: an individual, a group of individuals, an organization, a group of organizations, a computing system, a group of computing systems, or any other entity that can interact with computing environment 100.

In one embodiment of the present invention, user 112 can be a client.

B-Trees

Figure 2A:
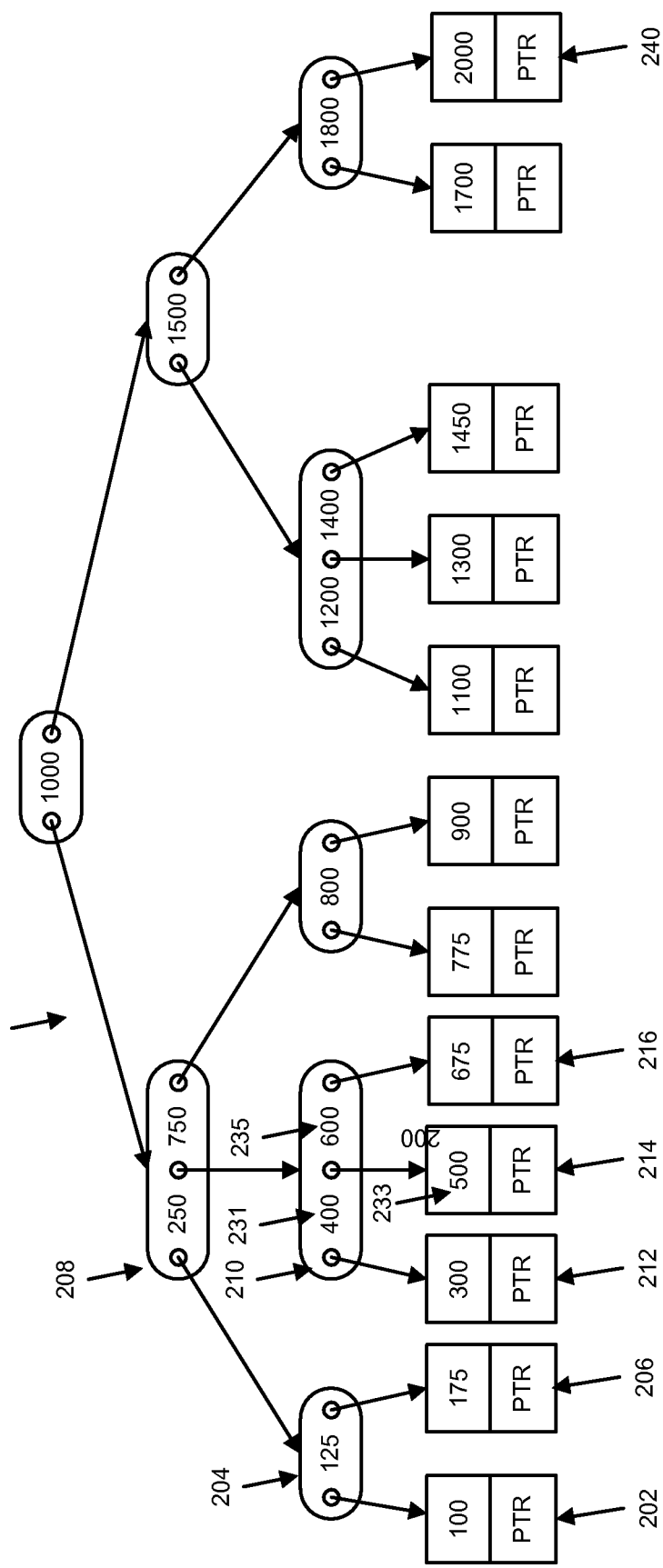
FIG. 2A illustrates an exemplary B-tree.

FIG. 2A illustrates an exemplary B-tree 200. In this example, B-tree 200 is a 2-3 tree. In other words, a non-leaf-node can point to either 2 child-nodes or 3 child-nodes. Note that in B-tree 200 the node-values are numeric; however, the node-values can be any type of value that can be ordered. In B-tree 200, for any given node, the left sub-tree includes only smaller node-values and the right sub-tree includes only larger node-values. Note that for nodes which are associated with multiple node-values, the pointer on the left of a given node-value points to a sub-tree that includes only smaller node-values, and the pointer to the right of the given node-value points to a sub-tree that includes only larger node-values.

In one embodiment of the present invention, the left sub-tree can include only larger node-values, and the right sub-tree can include only smaller node-values.

In one embodiment of the present invention, B-tree 200 is associated with an index-column. In this embodiment, the node-values of the leaf-nodes of B-tree 200 are indexes for an index-column in a table, and the pointers point to rows in the table which are associated with the index-column entries.

Figure 2B:
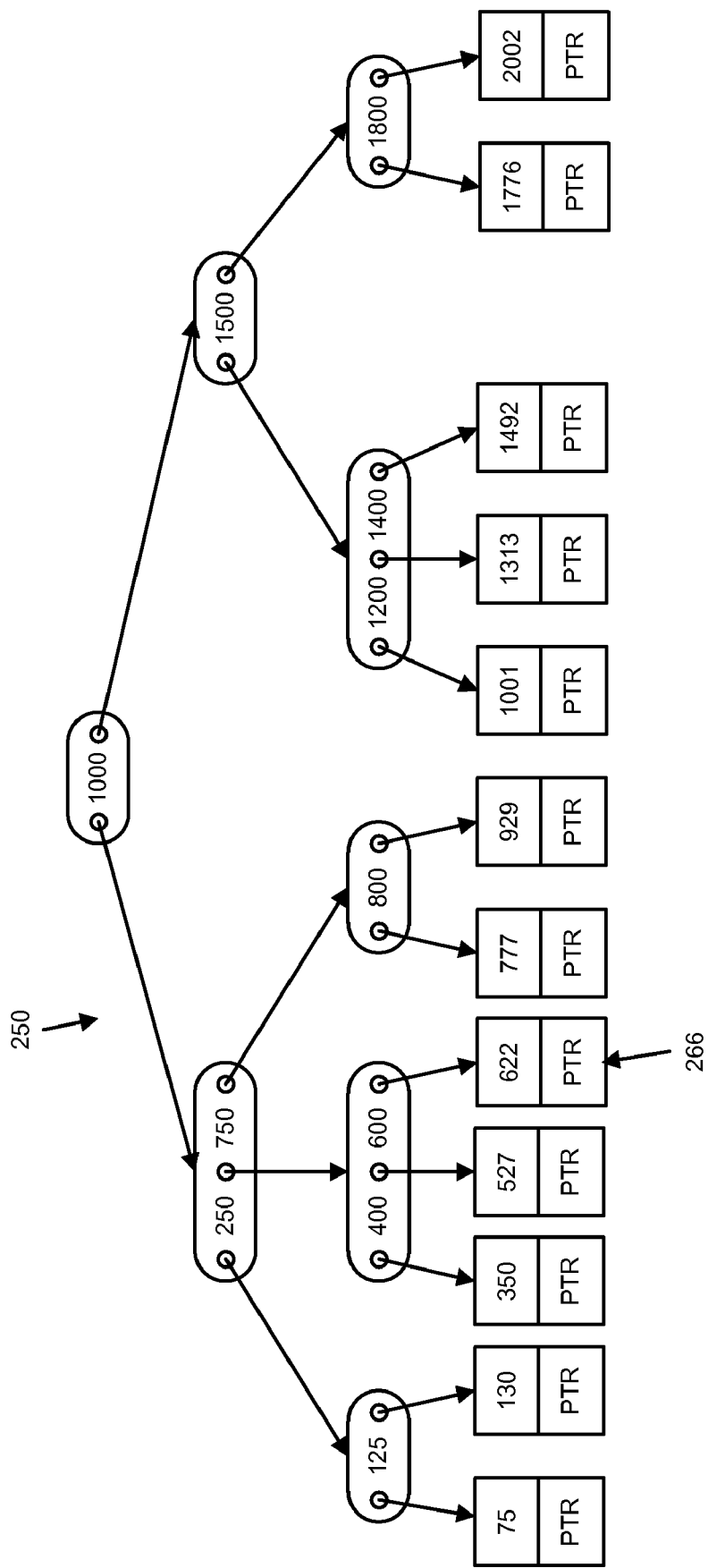
FIG. 2B illustrates a B-tree with masked leaf-nodes in accordance with an embodiment of the present invention.

FIG. 2B illustrates a B-tree 250 with masked leaf-nodes in accordance with an embodiment of the present invention. B-tree 250 represents the same index-column as B-tree 200, but the node-values of the leaf-nodes are masked. For example, node 266 is a masked version of node 216. Masking system 150 selects a node-value for node 266 between 600 (the lower-bound for node 266), and 750 (the upper-bound for node 266).

In one embodiment of the present invention, masking system 150 masks only a subset of the leaf-nodes of B-tree 200.

Masking a Column in a Database

Figure 3:
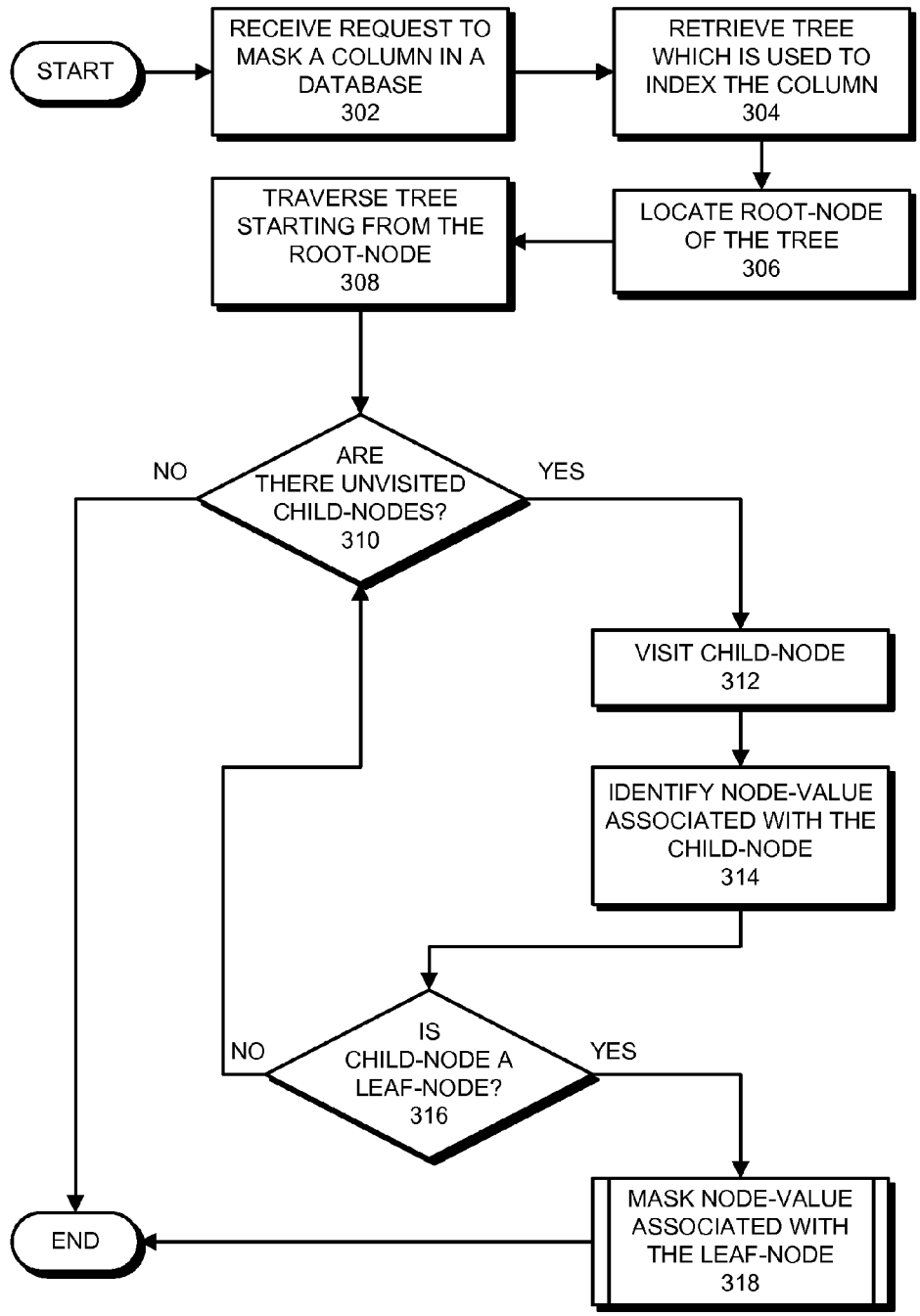
FIG. 3 presents a flow chart illustrating a process for masking a column in a database in accordance with an embodiment of the present invention.

FIG. 3 presents a flow chart illustrating a process for masking a column in a database 140 in accordance with an embodiment of the present invention. The process begins when masking system 150 receives a request to mask a column in database 140 (operation 302). In one embodiment of the present invention, the column can be an index-column, which serves as an index for a table in database 140. In response to the request, masking system 150 retrieves a tree, which is used to index the column (operation 304). Note that this tree can be a B-tree, such as B-tree 250.

In one embodiment of the present invention, the tree can be any variation on a B-tree. For example, the tree can be: a B+-tree, a B*-tree, or a B#-tree. More generally, the tree can be any type of tree that can be used to implement an index. For example, the tree can alternatively be an R-tree.

Next, masking system 150 locates the root-node of the tree (or a sub-tree) (operation 306).

Then, masking system 150 traverses the tree, starting from the root-node, until masking system 150 has visited all the leaf-nodes in the tree (operation 308). Note that masking system 150 can use any traversal technique to visit the leaf-nodes, such as a depth-first search, or a breadth-first search. For example, masking system 150 can descend B-tree 200 by following the left-most path to reach leaf-node 202. Then, masking system 150 can return to child-node 204 and continue to leaf-node 206. Next, masking system 150 can ascend to child-node 208 and continue to child-node 210. At this point, masking system 150 can visit each leaf-node associated with child-node 210 by starting from the left-most node, leaf-node 212, and then visiting leaf-node 214 and leaf-node 216. Masking system 150 can repeat this process until masking system 150 has visited each leaf-node in B-tree 200.

In one embodiment of the present invention, masking system 150 can traverse the tree using pre-order, in-order, or post-order traversal techniques.

In one embodiment of the present invention, masking system 150 traverses the tree until masking system 150 has visited all leaf-nodes in a sub-tree of the tree.

After visiting each child-node, masking system 150 determines if there are any unvisited child-nodes (operation 310). If not, the process completes. If so, masking system 150 visits an unvisited child-node (operation 312). Note that masking system 150 decides which child-node to visit based on the selected traversal technique. Masking system 150 then identifies a node-value associated with the child-node (operation 314). Note that identifying the node-value involves masking system 150 storing the node-value in a memory, such as a cache, for future access.

In one embodiment of the present invention, masking system 150 identifies a node-value associated with the root-node before traversing the tree.

In one embodiment of the present invention, node-values can be any type of sortable value. For example, the node-values can be numeric, alphabetic, lexical, symbol-based (wherein the symbols are associated with sortable values), etc.

Next, masking system 150 determines if the child-node is a leaf-node (operation 316). If not, masking system 150 leaves the node-value unmasked and proceeds to operation 310. If so, masking system 150 masks the node-value associated with the leaf-node (operation 318). Note that this is a multi-step operation that is described in more detail with reference to FIG. 4.

Masking a Node in a Column

Figure 4:
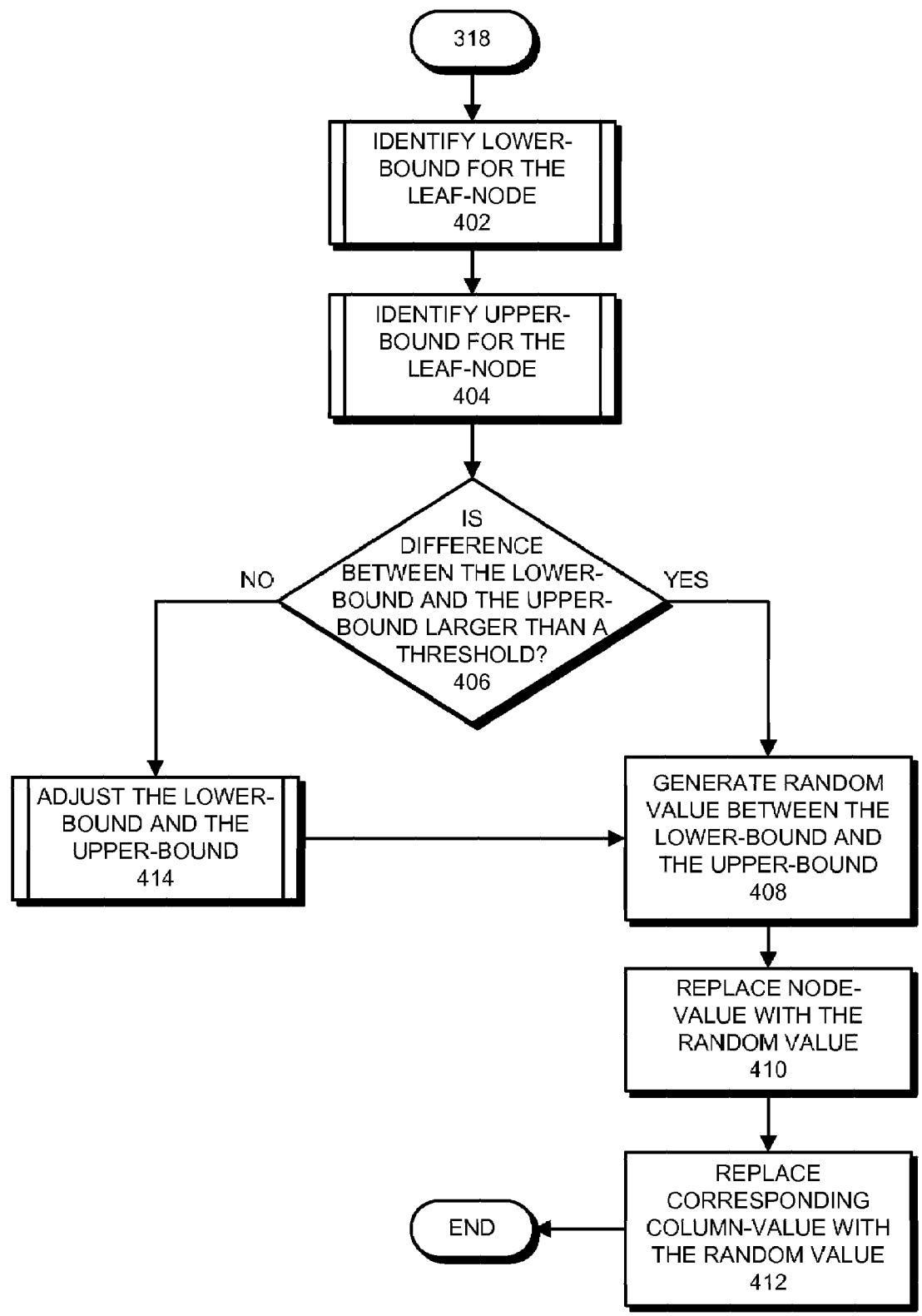
FIG. 4 presents a flow chart illustrating a process for masking a node in a column in accordance with an embodiment of the present invention.

FIG. 4 presents a flow chart illustrating a process for masking a node in a column in accordance with an embodiment of the present invention. The process begins when masking system 150 identifies a lower-bound for a leaf-node in a tree (operation 402). Masking system 150 then identifies an upper-bound for the leaf-node (operation 404). Note that operation 402 and operation 404 are both multi-step operations which are described in more detail with reference to FIG. 5A and FIG. 5B, respectively.

In some embodiments of the present invention, the lower-bound and the upper-bound are non-inclusive bounds. Alternatively, in some embodiments of the present invention, the lower-bound and the upper-bound are inclusive bounds.

Next, masking system 150 determines if the difference between the lower-bound and the upper-bound is larger than a threshold (operation 406). If not, masking system 150 adjusts the lower-bound and the upper-bound so that the difference between the lower-bound and the upper-bound is larger than the threshold (operation 414). Note that this is a multi-step operation that is described in more detail with reference to FIG. 6. Masking system 150 then proceeds to operation 408.

In one embodiment of the present invention, user 112, masking system 150, or database 140 determines the threshold.

In one embodiment of the present invention, to determine the threshold, masking system 150 associates numeric values with the node-values. For example, if the node-values are alphabetic, masking system 150 can associate 1 to A, 2 to B, etc.

In one embodiment of the present invention, user 112 or masking system 150 specifies a threshold that ensures a minimum number of possibilities for a node-value. For example, if user 112 desires the node-value of a given leaf-node to be one of at least ten possible values, user 112 specifies the threshold to be ten.

If the difference between the lower-bound and the upper-bound is larger than the threshold, masking system 150 generates a random value between the lower-bound and the upper-bound (operation 408). Masking system 150 then replaces a node-value for the leaf-node with the random value (operation 410). Next, masking system 150 replaces a corresponding column-value in a column associated with the tree with the random value (operation 412), wherein the corresponding column-value is associated with the leaf-node.

In one embodiment of the present invention, if the random value is equivalent to the node-value, masking system 150 generates a new random value.

In one embodiment of the present invention, masking system 150 does not include the upper-bound and the lower-bound when selecting the random value.

In one embodiment of the present invention, masking system 150 includes the upper-bound and the lower-bound when selecting the random value.

In one embodiment of the present invention, masking system 150 replaces the node-value for the leaf-node with: a value selected from a table of values; a value generated by a predefined formula, such as a hashing formula; a value specified by a user; a statistically generated or selected value, which maintains a statistical distribution of values in the tree; or any other value that can be generated or specified.

Identifying a Lower-Bound and an Upper-Bound

Figure 5A:
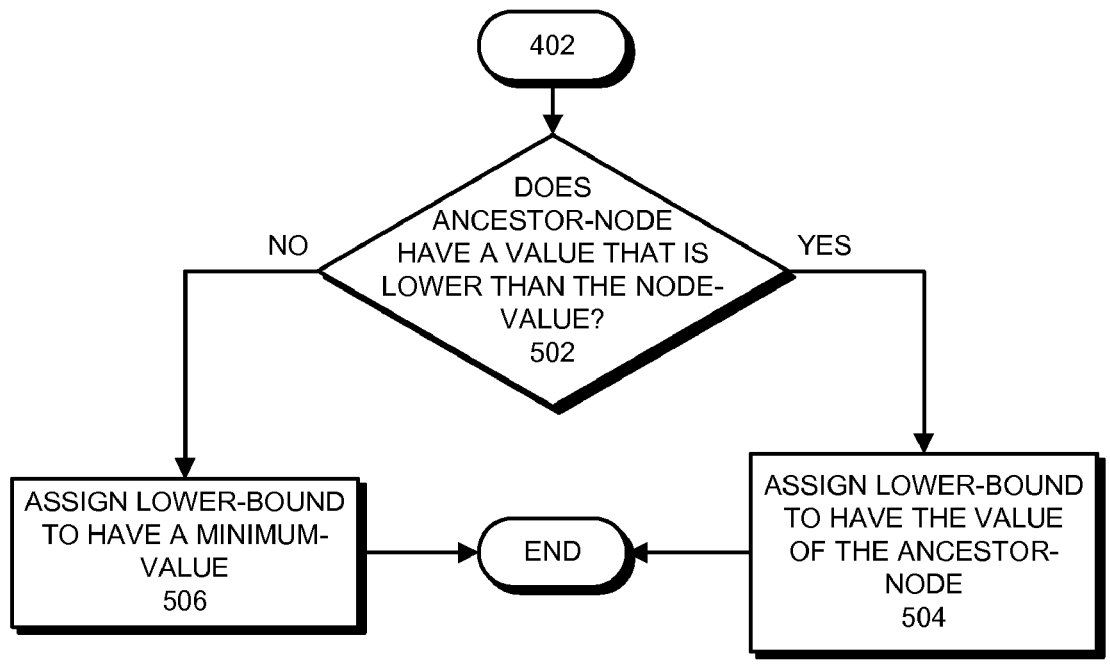
FIG. 5A presents a flow chart illustrating a process for identifying a lower-bound in accordance with an embodiment of the present invention.

FIG. 5A presents a flow chart illustrating a process for identifying a lower-bound in accordance with an embodiment of the present invention. The process begins when masking system 150 determines if an ancestor-node of the leaf-node has a value that is lower than the node-value associated with the leaf-node (operation 502). If so, masking system 150 assigns the lower-bound to have the value of the ancestor-node that is closest to the node-value and that is lower than the node-value (operation 504). For example, the lower-bound of node 216 is 600 because node 216's ancestor-node, node 210, has a value of 600. Note that node 210 also has a value of 400. In this example, masking system 150 selects the lower-bound to be 600 because 600 is closer than 400 to node 216's value of 675.

In one embodiment of the present invention, the ancestor-node can be any ancestor-node of the leaf-node and is not restricted to being the parent-node of the leaf-node. For example, masking system 150 selects the lower-bound for node 212 from node 208 because node 210 does not include a value that is lower than node 212's node-value. However, in a second example, although node 208 has a value that is lower than node 214's node-value, masking system 150 selects node 214's lower-bound from node 210 because the lower value associated with node 210 is closer to node 214's node-value than the values associated with node 208.

If there does not exist an ancestor-node that has a lower value than the leaf-node, masking system 150 assigns the lower-bound to have a minimum-value (operation 506). Note that in B-tree 200, this only occurs with node 202.

In one embodiment of the present invention, the minimum-value is the lowest value that can be associated with a node in the tree. Note that user 112, masking system 150, or database 140 can specify this minimum-value.

Figure 5B:
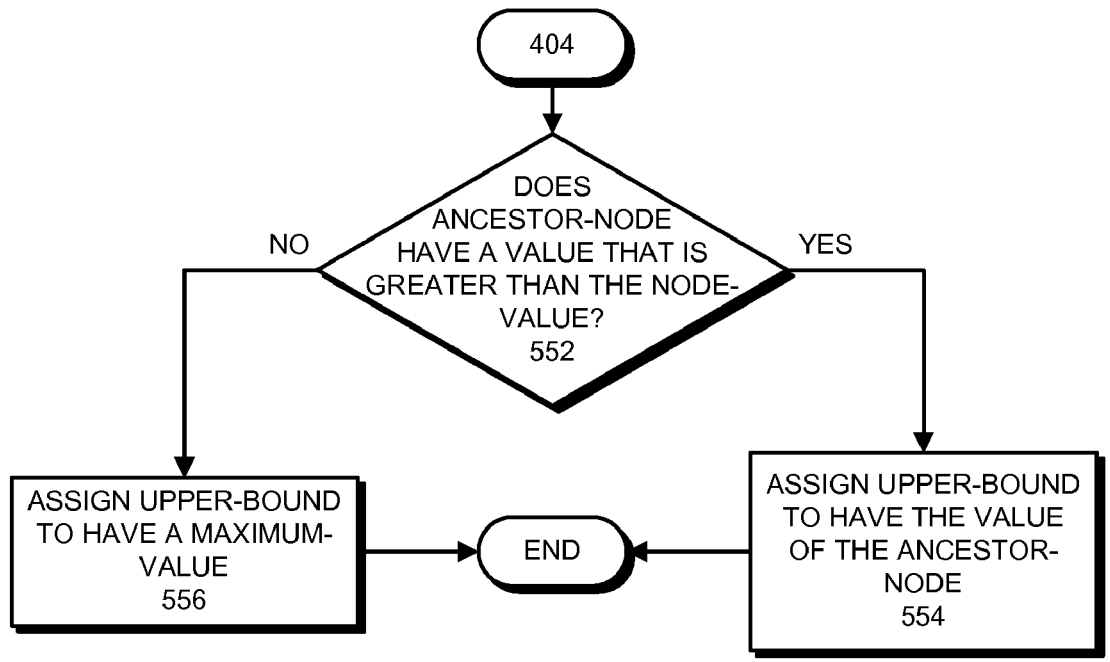
FIG. 5B presents a flow chart illustrating a process for identifying an upper-bound in accordance with an embodiment of the present invention.

FIG. 5B presents a flow chart illustrating a process for identifying an upper-bound in accordance with an embodiment of the present invention. The process begins when masking system 150 determines if an ancestor-node of the leaf-node has a value that is greater than the node-value associated with the leaf-node (operation 552). If so, masking system 150 assigns the upper-bound to have the value of the ancestor-node that is closest to the node-value and that is greater than the node-value (operation 554). For example, the upper-bound of node 212 is 400 because node 212's ancestor-node, node 210, has a value of 400. Note that node 210 also has a value of 600. In this example, masking system 150 selects the upper-bound to be 400 because 400 is closer than 600 to node 212's value of 300.

In one embodiment of the present invention, the ancestor-node can be any ancestor-node of the leaf-node and is not restricted to being the parent-node of the leaf-node. For example, masking system 150 selects the upper-bound for node 216 from node 208 because node 210 does not include a value that is greater than node 216's node-value. However, in a second example, although node 208 has a value that is greater than node 214's node-value, masking system 150 selects node 214's upper-bound from node 210 because the greater value associated with node 210 is closer to node 214's node-value than the values associated with node 208.

If there does not exist an ancestor-node that has a greater value than the leaf-node, masking system 150 assigns the upper-bound to have a maximum-value (operation 556). Note that in B-tree 200, this only occurs with node 240.

In one embodiment of the present invention, the maximum-value is the highest value that can be associated with a node in the tree. Note that user 112, masking system 150, or database 140 can specify this maximum-value.

Adjusting a Lower-Bound and an Upper-Bound

Figure 6:
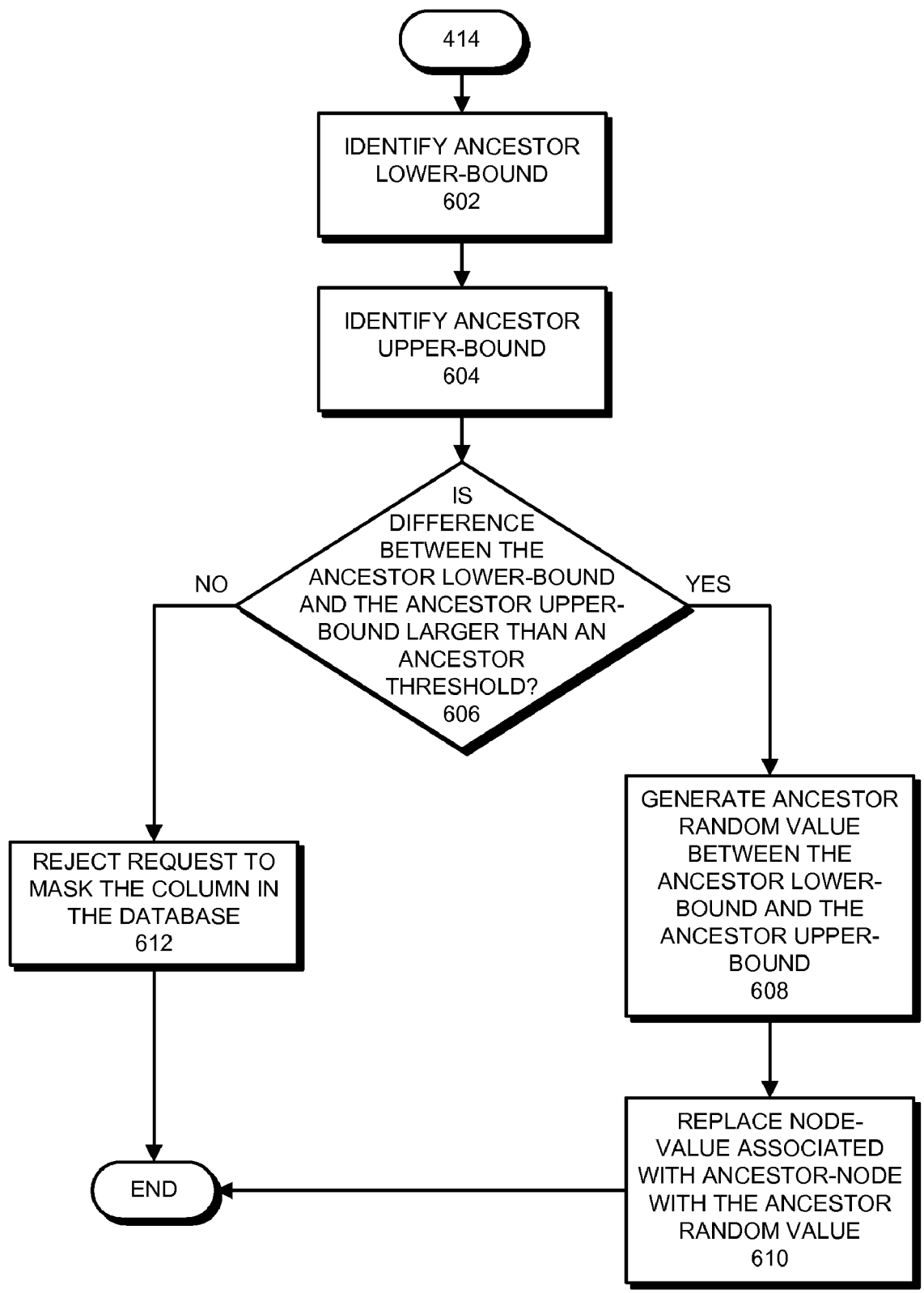
FIG. 6 presents a flow chart illustrating a process for adjusting a lower-bound and an upper-bound in accordance with an embodiment of the present invention.

FIG. 6 presents a flow chart illustrating a process for adjusting a lower-bound and an upper-bound in accordance with an embodiment of the present invention. The process begins when masking system 150 identifies an ancestor lower-bound which is associated with an ancestor-node of the leaf-node (operation 602). Masking system 150 then identifies an ancestor upper-bound which is associated with the ancestor-node of the leaf-node (operation 604). Note that in a B-tree, and in similar tree types that allow nodes to have more than two child-nodes, the ancestor lower-bound and the ancestor upper-bound may relate to one or multiple node-values associated with the ancestor-node. For example, to adjust the lower-bound and the upper-bound of leaf-node 212, masking system 150 only identifies an ancestor lower-bound and an ancestor upper-bound relating to node-value 231. Furthermore, masking system 150 only adjusts node-value 231. In a second example, to adjust the lower-bound and the upper-bound of leaf-node 214, masking system 150 may identify ancestor lower-bounds and ancestor upper-bounds relating to both node-value 231 and node-value 235. Furthermore, masking system 150 may adjust both node-value 231 and node-value 235.

In one embodiment of the present invention, identifying ancestor lower-bounds and ancestor upper-bounds may involve examining sibling node-values and additional leaf-nodes associated with the ancestor-node. For example, the ancestor upper-bound for node-value 231, is node-value 233. Similarly, the ancestor lower-bound for node-value 235 is node-value 233.

Next, masking system 150 determines if the difference between the ancestor lower-bound and the ancestor upper-bound is larger than an ancestor threshold (operation 606).

In one embodiment of the present invention, user 112, masking system 150, or database 140 can determine the ancestor threshold.

In one embodiment of the present invention, to determine the ancestor threshold, masking system 150 assigns numeric values to the node-values. For example, if the node-values are symbols, masking system 150 can assign 1 to *, 2 to &, etc.

In one embodiment of the present invention, user 112 or masking system 150 specifies an ancestor threshold that ensures a minimum number of possibilities for a node-value. For example, if user 112 desires the node-value of a given ancestor-node to be one of at least fifty possible values, user 112 specifies that the ancestor threshold is fifty.

In one embodiment of the present invention, the ancestor-node is the parent-node of the leaf-node.

If the difference between the ancestor lower-bound and the ancestor upper-bound is not larger than the ancestor threshold, masking system 150 rejects the request to mask the column in the database (operation 612).

In one embodiment of the present invention, if the difference between the ancestor lower-bound and the ancestor upper-bound is not larger than the ancestor threshold, masking system 150 recursively repeats the process illustrated in FIG. 6, and while doing so substitutes the ancestor-node for the leaf-node, and substitutes the ancestor of the ancestor-node for the ancestor-node. This recursive process continues until the difference between the ancestor lower-bound and the ancestor upper-bound is larger than the ancestor threshold, or the root-node is reached. If masking system 150 reaches the root-node and the difference between the maximum-value and the minimum-value is not larger than the ancestor threshold, then masking system 150 rejects the request to mask the column in the database. If masking system 150 reaches the root-node and the difference between the maximum-value and the minimum-value is larger than the ancestor threshold, then masking system 150 proceeds to operation 608 using the maximum-value as the ancestor upper-bound and the minimum-value as the ancestor lower-bound.

In one embodiment of the present invention, if the difference between the ancestor lower-bound and the ancestor upper-bound is not larger than the ancestor threshold, masking system 150 leaves the leaf-node unmasked, but continues the masking process on the remaining leaf-nodes.

If the difference between the ancestor lower-bound and the ancestor upper-bound is larger than the ancestor threshold, masking system 150 generates a random value between the ancestor lower-bound and the ancestor upper-bound (operation 608). Masking system 150 then replaces the node-value associated with the ancestor-node with the ancestor random-value (operation 610). Note that replacing the node-value associated with the ancestor-node may have an affect on the lower-bound and the upper bound of other leaf-nodes and/or child-nodes.

In one embodiment of the present invention, masking system 150 selects a new node-value based on a node-selection technique. In this embodiment, masking system 150 replaces the node-value associated with the ancestor-node with the new node-value.

In one embodiment of the present invention, the node-selection technique can involve selecting the ancestor upper-bound, selecting the ancestor lower-bound, selecting a new node-value that is within a threshold difference of the ancestor node-value, selecting a new node-value that is within a threshold difference of the ancestor lower-bound, selecting a new node-value that is within a threshold difference of the ancestor upper-bound, selecting a node-value from a table of node-values, selecting a node-value that maintains a particular statistical distribution of node-values, or any other formula for selecting a new node-value.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for masking index values in a database, the method comprising:
   receiving a request to mask an indexed column of a table in a database;
   retrieving an index, which comprises a tree that provides a sorted representation of values in the column, wherein leaf-nodes of the tree are associated with fields to be masked in the column;
   responsive to a difference between a lower-bound and an upper-bound for a leaf-node of the tree being larger than a threshold, generating a node value between the lower-bound and the upper-bound for the leaf-node such that the tree does not need to be resorted after masking the field associated with the leaf-node, wherein the node value is within a lower-bound and an upper-bound determined by the values of nodes adjacent to the leaf-node in the tree;
   responsive to the difference between the lower-bound and the upper-bound not being larger than the threshold, adjusting the lower-bound or the upper-bound so that their difference is larger than the threshold, and generating a node value between the post-adjustment lower-bound and upper-bound;
   masking the leaf-node of the tree using the generated node value without resorting the tree; and
   masking the field in the column associated with the leaf-node of the tree using the generated node value, thereby masking both the tree and the table in the database while traversing the tree.

2. The method of claim 1, wherein traversing the tree comprises traversing the tree starting from the root-node, until all leaf-nodes have been visited.

3. The method of claim 1, wherein the tree is a B-tree.

4. The method of claim 1, wherein traversing the tree involves identifying node values associated with the root-node and each visited child-node.

5. The method of claim 1, wherein generating the node value comprises:
   identifying the lower-bound and the upper-bound for the leaf-node;
   responsive to the difference between the lower-bound and the upper-bound being larger than the threshold: replacing the node value with the generated node value, and
   replacing a corresponding field value with the generated node value.

6. The method of claim 5, wherein identifying the lower-bound for the leaf-node involves:
   determining if an ancestor-node of the leaf-node has a value that is lower than the node value;
   if so, assigning the lower-bound to have the value of the ancestor-node that is closest to the node value, and that is lower than the node value; and
   if not, assigning the lower-bound to have a minimum value, which is the lowest value that can be associated with a node in the index tree.

7. The method of claim 5, wherein identifying the upper-bound for the leaf-node involves:
   determining if an ancestor-node of the leaf-node has a value that is greater than the node value;
   if so, assigning the upper-bound to have the value of the ancestor-node that is closest to the node value, and that is greater than the node value; and
   if not, assigning the upper-bound to have a maximum value, which is the highest value that can be associated with a node in the tree.

8. The method of claim 5, wherein adjusting the lower-bound and the upper-bound involves:
   identifying an ancestor lower-bound and an ancestor upper-bound which is associated with an ancestor-node of the leaf-node;
   determining if the difference between the ancestor lower-bound and the ancestor upper-bound is larger than an ancestor threshold;
   if so,
      generating an ancestor value which is between the ancestor lower-bound and the ancestor upper-bound, and
      replacing a node value associated with the ancestor-node with the ancestor value; and
   if not, rejecting the request to mask the column.

9. The method of claim 1, wherein the node value is bound by a range determined by the generated node value of a parent-node of the leaf-node.

10. A non-transitory computer-readable storage medium storing instructions that when executed by a computer cause the computer to perform a method for masking index values in a database, the method comprising:
   receiving a request to mask an indexed column of a table in a database;
   retrieving an index, which comprises a tree that provides a sorted representation of values in the column, wherein leaf-nodes of the tree are associated with fields to be masked in the column;
   responsive to a difference between a lower-bound and an upper-bound for a leaf-node of the tree being larger than a threshold, generating a node value between the lower-bound and the upper-bound for the leaf-node such that the tree does not need to be resorted after masking the field associated with the leaf-node, wherein the node value is within a lower-bound and an upper-bound determined by the values of nodes adjacent to the leaf-node in the tree;
   responsive to the difference between the lower-bound and the upper-bound not being larger than the threshold, adjusting the lower-bound or the upper-bound so that their is larger than the threshold, and generating a node value between the post-adjustment lower-bound and upper-bound;

masking the leaf-node of the tree using the generated node value without resorting the tree; and masking the field in the column associated with the leaf-node of the tree using the generated node value, thereby masking both the tree and the table in the database while traversing the tree.

11. The computer-readable storage medium of claim 10, wherein traversing the tree comprises traversing the tree starting from the root-node, until all leaf-nodes have been visited.

12. The computer-readable storage medium of claim 10, wherein the tree is a B-tree.

13. The computer-readable storage medium of claim 10, wherein traversing the tree involves identifying node values associated with the root-node and each visited child-node.

14. The computer-readable storage medium of claim 10, wherein generating the node value comprises:
identifying the lower-bound and the upper-bound for the leaf-node, wherein the lower-bound and the upper-bound are determined by values of nodes adjacent to the leaf-node in the tree;
responsive to the difference between the lower-bound and the upper-bound being larger than the threshold:
replacing the node value with the generated node value, and
replacing a corresponding field value with the generated node value.

15. The computer-readable storage medium of claim 14, wherein identifying the lower-bound for the leaf-node involves:
determining if an ancestor-node of the leaf-node has a value that is lower than the node value;
if so, assigning the lower-bound to have the value of the ancestor-node that is closest to the node value, and that is lower than the node value; and
if not, assigning the lower-bound to have a minimum value, which is the lowest value that can be associated with a node in the tree.

16. The computer-readable storage medium of claim 14, wherein identifying the upper-bound for the leaf-node involves:
determining if an ancestor-node of the leaf-node has a value that is greater than the node value;
if so, assigning the upper-bound to have the value of the ancestor-node that is closest to the node value, and that is greater than the node value; and
if not, assigning the upper-bound to have a maximum value, which is the highest value that can be associated with a node in the tree.

17. The computer-readable storage medium of claim 14, wherein adjusting the lower-bound and the upper-bound involves:
identifying an ancestor lower-bound and an ancestor upper-bound which is associated with an ancestor-node of the leaf-node;
determining if the difference between the ancestor lower-bound and the ancestor upper-bound is larger than an ancestor threshold;
if so,
generating an ancestor value which is between the ancestor lower-bound and the ancestor upper-bound, and
replacing a node value associated with the ancestor-node with the generated ancestor value; and if not, rejecting the request to mask the column.

18. A computer system that masks index values in a database, comprising:
a memory;
a processor;
a receiving mechanism configured to receive a request to mask an indexed column in a database;
a retrieval mechanism configured to retrieve an index, which comprises a tree that provides a sorted representation of the column, wherein leaf-nodes of the tree are associated with fields to be masked in the column;
a generating mechanism configured to generate a node value between the lower-bound and the upper-bound for the leaf-node such that the tree does not need to be resorted after masking the field associated with the leaf-node in response to a difference between a lower-bound and an upper-bound for a leaf-node of the tree being larger than a threshold, wherein the node value is within a lower-bound and an upper-bound determined by the values of nodes adjacent to the leaf-node in the tree;
an adjusting mechanism configured to adjust the lower-bound or the upper-bound so that their is larger than the threshold in response to the difference not being larger than the threshold, and to generate a node value between the post-adjustment lower-bound and upper-bound; and
a masking mechanism configured to:
mask the leaf-node of the tree using the generated node value without resorting the tree; and
masking the field in the column associated with the leaf-node of the tree using the generated node value.

19. The computer system of claim 18, further comprising a traversal mechanism configured to traverse the tree starting from root-node until all leaf-nodes have been visited.

20. The computer system of claim 19, wherein the traversal mechanism is further configured to identify node values associated with the root-node and each visited child-node.

21. The computer system of claim 18, wherein the determining mechanism is further configured to identify the lower-bound and the upper-bound for the leaf-node;
wherein, in response to the difference between the lower-bound and the upper-bound being larger than the threshold, the generating mechanism is further configured to:
replace the node value with the generated node value, and
replace a corresponding field value with the random node value.

* * * * *

UNITED STATES PATENT AND TRADEMARK OFFICE
CERTIFICATE OF CORRECTION

| | | |
|---|---|---|
| PATENT NO. | : 7,937,375 B2 | Page 1 of 1 |
| APPLICATION NO. | : 11/780340 | |
| DATED | : May 3, 2011 | |
| INVENTOR(S) | : Wong | |

It is certified that error appears in the above-identified patent and that said Letters Patent is hereby corrected as shown below:

In column 11, line 1, in Claim 10, after "their" insert -- difference --.

In column 12, line 8-10, In Claim 17, delete "replacing a node value associated with the ancestor-node with the generated ancestor value; and if not, rejecting the request to mask the column." and
insert -- replacing a node value associated with the ancestor-node with the generated ancestor value; and if not, rejecting the request to mask the column. --, therefor.

In column 12, line 31, in Claim 18, after "their" insert -- difference --.

In column 12, line 42, in Claim 19, after "from" insert -- the --.

Signed and Sealed this
Eleventh Day of October, 2011

David J. Kappos
*Director of the United States Patent and Trademark Office*